United States Patent [19]

Uttenthaler

[11] Patent Number: 5,137,107
[45] Date of Patent: Aug. 11, 1992

[54] JOINT DAMPING DEVICE

[75] Inventor: Josef Uttenthaler, Hettenshausen, Fed. Rep. of Germany

[73] Assignee: MAN Nutzfahrzeuge A.G., Munich, Fed. Rep. of Germany

[21] Appl. No.: 492,764

[22] Filed: Mar. 13, 1990

[30] Foreign Application Priority Data

Apr. 14, 1989 [DE] Fed. Rep. of Germany ....... 3912383

[51] Int. Cl.$^5$ .................. B60K 17/358; B60T 7/12; B61D 17/00
[52] U.S. Cl. ................................ 180/235; 280/432; 105/4.1
[58] Field of Search .............. 105/3, 4.4, 8.1; 180/135, 139, 235; 280/403, 408, 432, 446.1, 456.1, 460.1, 467, 468, 492, DIG. 14; 188/322.19

[56] References Cited

U.S. PATENT DOCUMENTS

| | | | |
|---|---|---|---|
| 2,843,417 | 7/1958 | Wahl et al. | 105/3 |
| 2,896,734 | 7/1959 | Toth | 180/139 |
| 3,176,801 | 4/1965 | Huff | 188/299 |
| 3,661,427 | 6/1972 | Hodge | 303/116 |
| 3,877,347 | 4/1975 | Sheesley et al. | 188/313 X |
| 4,106,792 | 8/1978 | Schutlz | 280/432 |
| 4,355,849 | 10/1982 | Wilson | 303/116 |
| 4,365,685 | 12/1982 | Ratskó et al. | 180/135 |
| 4,564,176 | 1/1986 | Schnetz | 267/64.11 |
| 4,588,171 | 5/1986 | Stephens | 188/318 X |
| 4,655,440 | 4/1987 | Eckert | 188/314 X |
| 4,681,335 | 7/1987 | Ledermann et al. | 280/446.1 |
| 4,688,818 | 8/1987 | Grassmuck | 180/135 X |
| 4,697,526 | 10/1987 | Vigliani | 280/403 X |
| 4,786,034 | 11/1988 | Heess et al. | 188/314 X |
| 4,819,770 | 4/1989 | Hahn | 188/322.19 X |
| 4,890,684 | 1/1990 | Simmons | 180/135 |

FOREIGN PATENT DOCUMENTS

| | | | |
|---|---|---|---|
| 1191847 | 4/1965 | Fed. Rep. of Germany | 105/3 |
| 1305153 | 8/1962 | France | 180/235 |

Primary Examiner—Robert J. Oberleitner
Assistant Examiner—Josie A. Ballato
Attorney, Agent, or Firm—Ladas & Parry

[57] ABSTRACT

A damping device for use with an articulation joint of an articulated omnibus. Between the front vehicle and the rear vehicle connected with the outer race ring of a live ring or between the rear vehicle and the front vehicle connected with the inner race ring of the live ring a hydraulic cylinder or shock absorber is arranged so that in the extended, in-line alignment position of the omnibus it is in its inner dead center position. It is connected hydraulically in parallel with a further hydraulic cylinder or shock absorber. The latter is preferably placed slightly obliquely and is spaced from the longitudinal median plane of the articulated omnibus when the omnibus is in the in-line setting, the hydraulic cylinder or shock absorber being pivotally connected at one first end with one of the two vehicles and at a second end to that race ring of the live ring which is connected to the other of the two vehicles.

16 Claims, 7 Drawing Sheets

JOINT DAMPING DEVICE

BACKGROUND OF THE INVENTION (a) Field of the Invention

The invention relates to a joint damping device for use in an articulated omnibus whose front vehicle is connected with the rear vehicle by a live ring as a rotary joint, there being at least one hydraulic cylinder or shock absorber between the front and rear vehicle.

(b) Background and Prior Art

Articulated omnibuses having a rear engine and transmission on the axle of the rear vehicle—so-called pusher systems—require an anti-jackknifing device for winter operation. Furthermore in the case of such designs of articulated buses a damping means is required at the joint for reasons of stability owing to the unusual weight distribution, more especially at high speeds of travel.

Articulation angle control systems for articulated buses in the form of articulation locking devices and articulation dampers have been proposed in a large number of different designs. However, presently it is only necessary to take into account the three systems which are used in practice. Thus one form (see the German specification, DE-OS 2,420,203) of articulation locking device uses two hydraulic cylinders located between the front and rear vehicles whose actuation to lock the articulation is achieved by a system with two potentiometers, an electronic circuit and a hydraulic control system and the locking of the articulation is at a given angle in response to a comparison between the steering angle and the articulation angle, other parameters, i.e. speed of travel, articulation rate and articulation acceleration being taken into account as well. In accordance with another design (see German specification, DE-OS, 3,623,655) there is a double acting hydraulic cylinder arranged in the front vehicle transversely of the direction of travel so that the longitudinally moving cylindrical casing is connected with two steel cords which are trained about a rocking segment and are connected with the part of the live ring connected to the rear vehicle. Control is such as to respond to the rate of articulation using two potentiometers, an electronic circuit and a hydraulic control system. The system may also be set manually so that the damping action is constant.

The hydraulic, electronic and electric controlling and monitoring devices required for the known systems make them very elaborate. Apart from the liability to failure in the numerous electrical connections and components installed, there is also the necessity of a slow and thus expensive setting and matching procedure, which may only be performed by trained staff. Articulated buses fitted with such systems are very often not suitable for export. There is thus a demand for simple, straightforward anti-jackknifing systems, which if required may be serviced or repaired by staff of average training.

One articulation damping device (see the German specification 2,748,713) has been proposed which is able to operate without electronic control elements, and it has means for automatically adapting it to the road conditions. The cylinders arranged between the primary vehicle and the secondary one are in the form of biased damping cylinders, which act with a stabilizing effect on the articulated vehicle when it takes a corner.

SUMMARY OF THE INVENTION

One object of the instant invention is to devise a simple system for regulation of resistance to jackknifing in a way dependent on the damping moment in response to the articulation angle while dispensing with any elaborate electronic and hydraulic control system and means for function monitoring.

In order to achieve this or other objects appearing from the present specification, claims and drawings, a hydraulic cylinder or shock absorber is arranged between the front vehicle and the rear vehicle connected with the outer race ring of the live ring or between the rear vehicle and the front vehicle connected with the inner race ring of the said live ring in the longitudinal median plane of the articulated omnibus, so that in an extended or in-line position of the omnibus the shock absorber or hydraulic cylinder is located in its inner dead center position and a further hydraulic cylinder or shock absorber is connected separately from the first hydraulic cylinder or shock absorber, and which, preferably in a setting which is slightly oblique, is located at a distance from the longitudinal median plane of the articulated omnibus in its mid-stroke position, said further hydraulic cylinder or further shock absorber being pivotally attached at one end to the respective vehicle and at the other end in the transverse median plane of the respective part of the live ring.

In accordance with a further aspect, the invention provides a joint damping device in which one respective hydraulic cylinder or shock absorber is arranged between the front vehicle and the live ring part corresponding thereto and between the rear vehicle and the live ring part corresponding thereto so that each hydraulic cylinder or shock absorber is so arranged in the longitudinal median plane of the articulated omnibus that in the extended setting of the omnibus the hydraulic cylinders or shock absorbers are in their inner dead center settings and in a parallel hydraulic circuit a respective further hydraulic cylinder or shock absorber is arranged so as to be set, preferably slightly obliquely, at a distance from the longitudinal median plane of the articulated omnibus and so as to be at the mid stroke setting in the extended setting of the articulated omnibus, the further hydraulic cylinder or further shock absorber being pivotally connected at one end with the respective vehicle of the omnibus and being pivotally connected at the other respective end in the transverse median plane of the respective live ring part.

If attention is focused solely on the hydraulic cylinder or shock absorber arranged in the longitudinal median plane of the articulated omnibus, the stroke and thus also the damping moment of the hydraulic cylinder or shock absorber will be dependent on the angle of articulation between the front and rear vehicles of the omnibus such that during straight ahead travel the damping moment will be zero and in the case of small departures from straight ahead travel there will be small damping moments and with an increase in the articulation angle the damping moment will increase exponentially firstly in accordance with a regressive and then in accordance with a progressive function or curve so that the practical requirements of countering the danger, which increases with an increase in the articulation angle, of jackknifing will be optimally met with very simple means. The curve of damping moment as a function of thrust on the piston of the hydraulic cylinder or shock absorber will be substantially less steep than the curve in response to tension, that is to say on motion along the curve in the inward direction there will be more resistance than when moving in the outward direction when the omnibus straightens out to be in the in-line position.

If on the other hand attention is solely focused on the hydraulic cylinder or shock absorber arranged at a distance from the longitudinal median plane there will be seen to be a substantial damping moment even in the straight ahead travel setting so that even in such extended position there will be a damping effect opposing pivoting motion of the omnibus. Owing to the combination of the cylinder, arranged in the longitudinal median plane with the further cylinder arranged at a distance from such plane and connected hydraulically in parallel, a characteristic of the damping moments will be achieved, which will be the result of a superposition of the damping moments of the individual cylinders, that is to say, even in the extended position there will be a damping moment, which then merges into a progressive damping function. This will serve to ensure full driver control when performing the difficult maneuver of leaving a parking bay, and more especially when the roads are iced over. By means of the device in accordance with the invention it is possible to ensure an optimum damping effect taking into account all road and driving conditions in a highly economical manner.

Basically, the anti-jackknifing device in accordance with the invention functions with one respective hydraulic cylinder or shock absorber. This is the most economical design. However, as already indicated hereinabove it is possible to have two respective hydraulic cylinders or shock absorbers with different design purposes, namely for reasons dictated by the space available to use slim cylinders or in the case of cylinders having the normal diameter to create a redundant system so that even in the case of failure there will be no impairment of the road holding properties.

In accordance with one further feature of the invention an adjustable choke valve is placed in a connecting line between the ports of the working chambers or spaces of the hydraulic cylinder. This makes it possible to modify the damping moment and if required to adapt it to the geographic and seasonal road conditions. However, it is also possible to have a respective adjustable choke valve in the connection line for both ports of the hydraulic cylinder so as to be associated with each port, the respectively other port being shut off by check valves.

As part of a still further possible feature of the invention a number of parallel-connected choke valves with different choke openings can be arranged in the connecting line, the different choke valves being able to be switched over to different articulation angle ranges. It is in this manner that it is possible to more definitely delimit particularly dangerous articulation angle ranges.

If a shut off valve is placed in the hydraulic circuit it is possible to ensure a constant damping effect, which may be set to the maximum value as may be required and which also results from the provision of an associated overpressure valve. This higher constant damping effect may turn out to be necessary as for instance when leaving a parking bay or if the driver should suddenly be confronted with hazardous road conditions, as for example when the road is iced up. The switching over to the constant damping effect or means may be carried out either in accordance with the subjective feelings of the driver who depresses a button, or objectively in accordance with a system an anti-wheel lock or anti-wheel spin system.

In accordance with an alternative design for the use of hydraulic cylinders it is also possible to have shock absorbers with a damping characteristic varying as a function of the stroke, there being one or more grooves in the cylinder bore in the central part of the stroke in order to ensure a smaller damping effect and as a result in the extended or in-line position of the articulated vehicles more rapid maneuvers are possible.

One embodiment of the invention will now be described in detail with reference to the accompanying drawings.

DETAILED DESCRIPTION OF THE INVENTION

Figure 5:
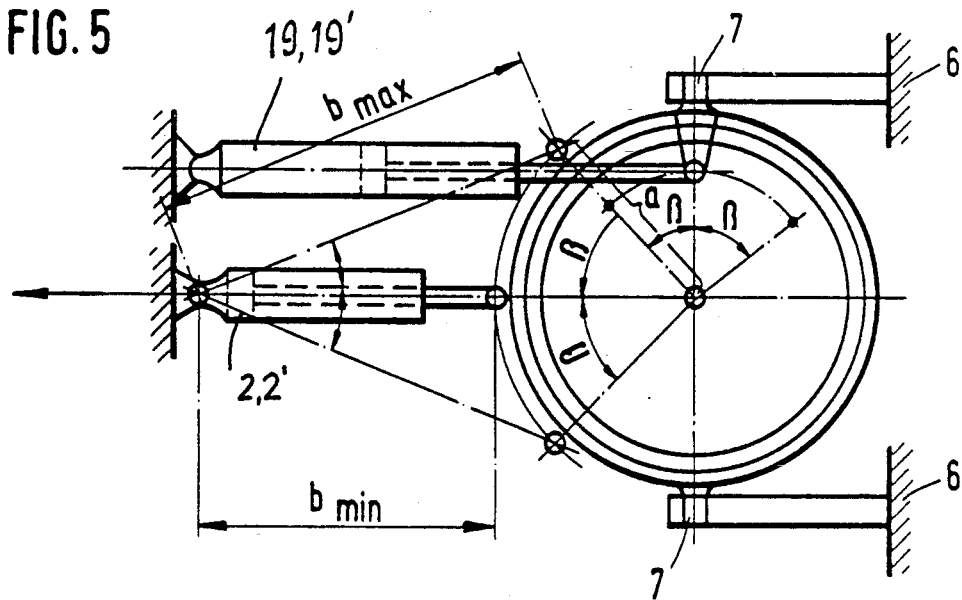
FIG. 5 is a plan view of the joint damping device in accordance with the invention.
Figure 6:
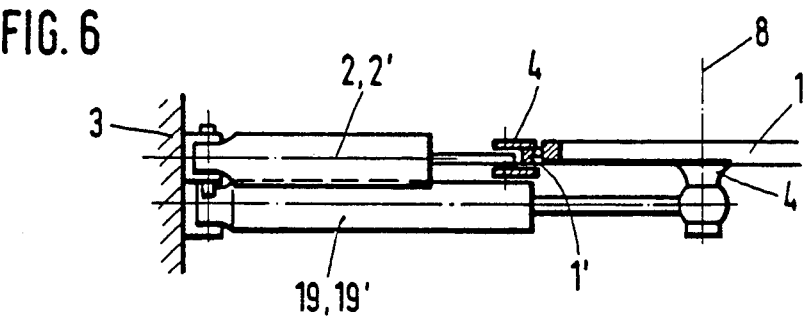
FIG. 6 shows the joint damping device in accordance with the invention in side elevation and in plan.

In order to best understand the invention attention may be concentrated in FIGS. 5 and 6, the other figures, that is to say 1 through 4 and the accompanying graphs showing how the invention may be used to tackle specific engineering problems and thus to give deeper understanding thereof.

Figure 1:
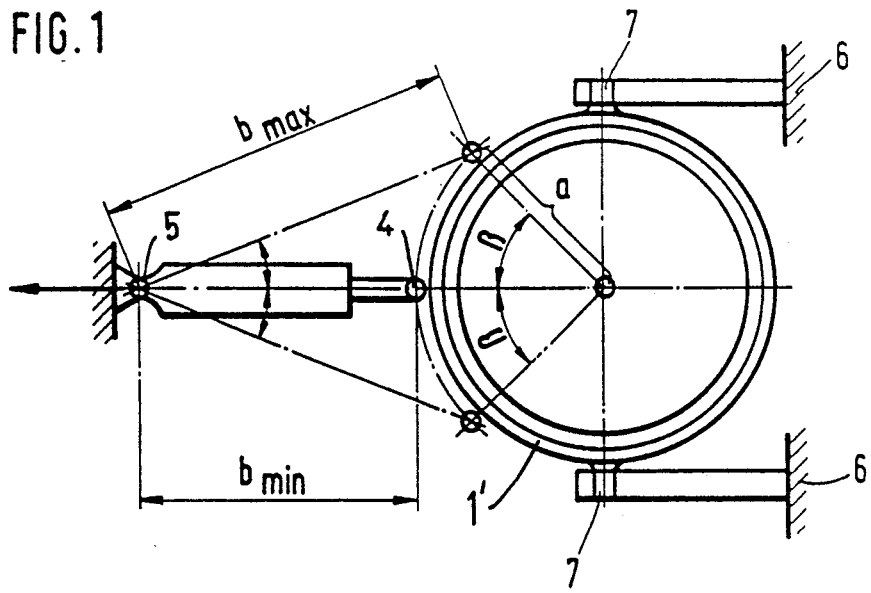
FIG. 1 is a pan view of a joint damping device.

FIG. 1 shows a joint damping device fitted to an articulated omnibus (FIG. 7), the front vehicle 3 of such bus being connected with the second, rear vehicle 6 via a live ring 1. Between the front vehicle 3 and the outer race ring 1' (connected via pivot joints 7 and linkage means with the rear vehicle 6 of the ;omnibus) there is a hydraulic cylinder or shock absorber 2 or, respectively, 2' arranged in the longitudinal median plane of the vehicle and attached by means of a pivot or ball joint 4 with the outer race ring 1' of the live ring and by a pivot or ball joint 5 with the front vehicle. When travelling straight ahead, that is to say in the extended relative setting of the front vehicle 3 and of the rear or following vehicle 6, i.e. with the front and rear vehicles extending in longitudinal alignment, the hydraulic cylinder or shock absorber 2 or, respectively, 2' will assume its inner dead center position, that is to say the piston stroke, the damping force and the damping moment are equal to zero.

Figure 7:
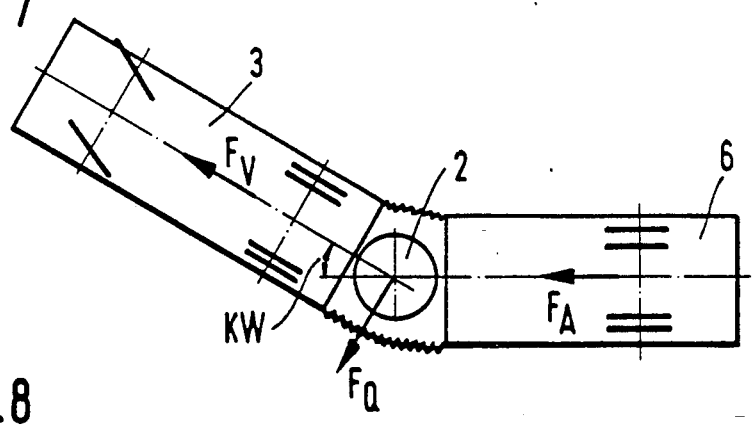
FIG. 7 is a diagrammatic representation of an articulated omnibus
Figure 8:
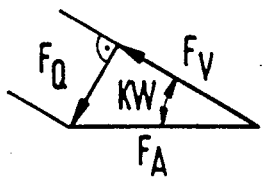
FIG. 8 is a diagram of the triangle of forces applied at the pivot joint of the omnibus.
Figure 9:
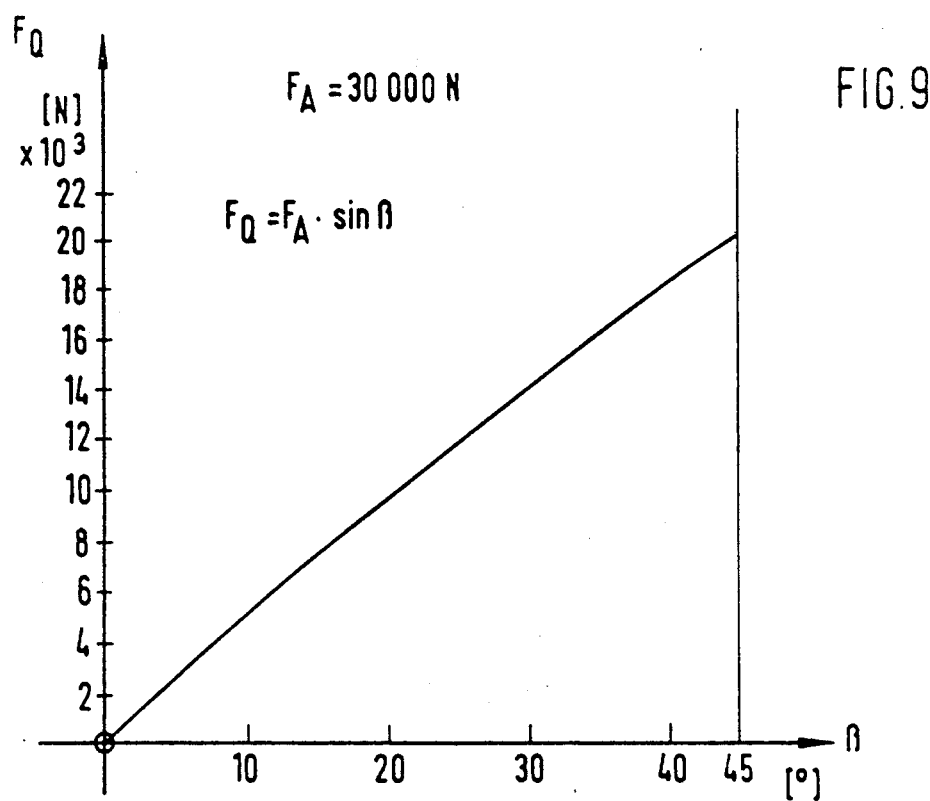
FIG. 9 is a graph of Fa as a function of articulation angle of the pivot joint.
Figure 10:
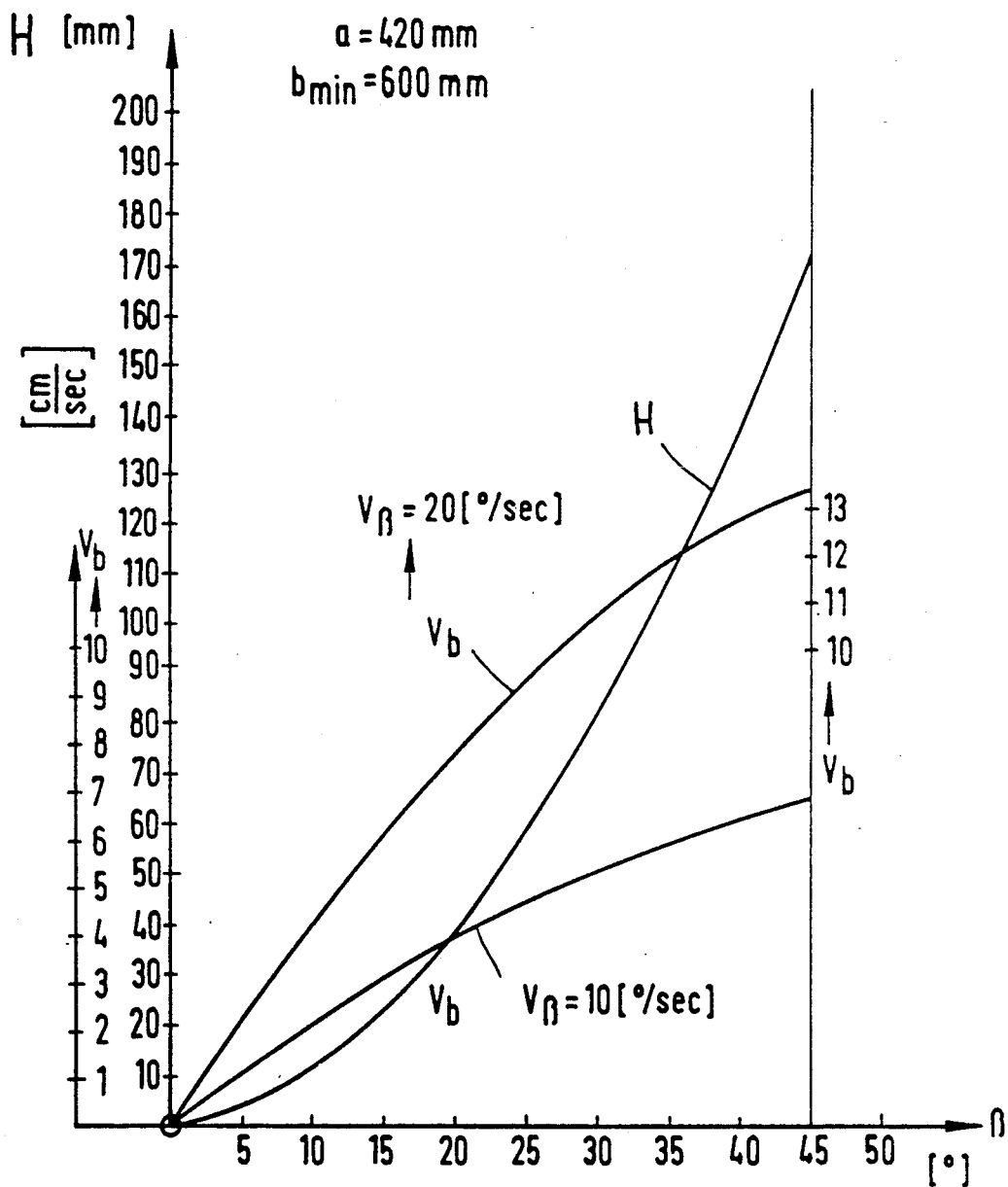
FIG. 10 is a graph of cylinder stroke and piston velocity as a function of articulation angle (related to FIGS. 1 and 2).

Upon an increase in the articulation angle $\beta$ between the vehicles the transverse force $F_Q$, resulting from the drive Force $F_A$ and the articulation angle $\beta$, varies in accordance with the equation $F_Q = F_A \cdot \sin \beta$ (see FIGS. 7, 8 and 9). FIG. 10 indicates the course of the stroke H and the changes in stroke rate $V_b$ at two constant articulation angle rates i.e. $V_\beta = 10°/\text{sec}$ and $20°$.

$$V_b = \frac{\frac{\pi}{180} \cdot (a + b) \cdot a \cdot \sin\beta}{\sqrt{2a^2 + 2ab_{min} + b_{min}^2 - 2(a + b_{min})a \cdot \cos\beta}}$$

$$H = b_x - b_{min} = \sqrt{\{[(a + b) - (\cos\beta) \cdot a]^2 + [\sin\beta) \cdot a]^2\}} - b_{min}$$

Figure 11:
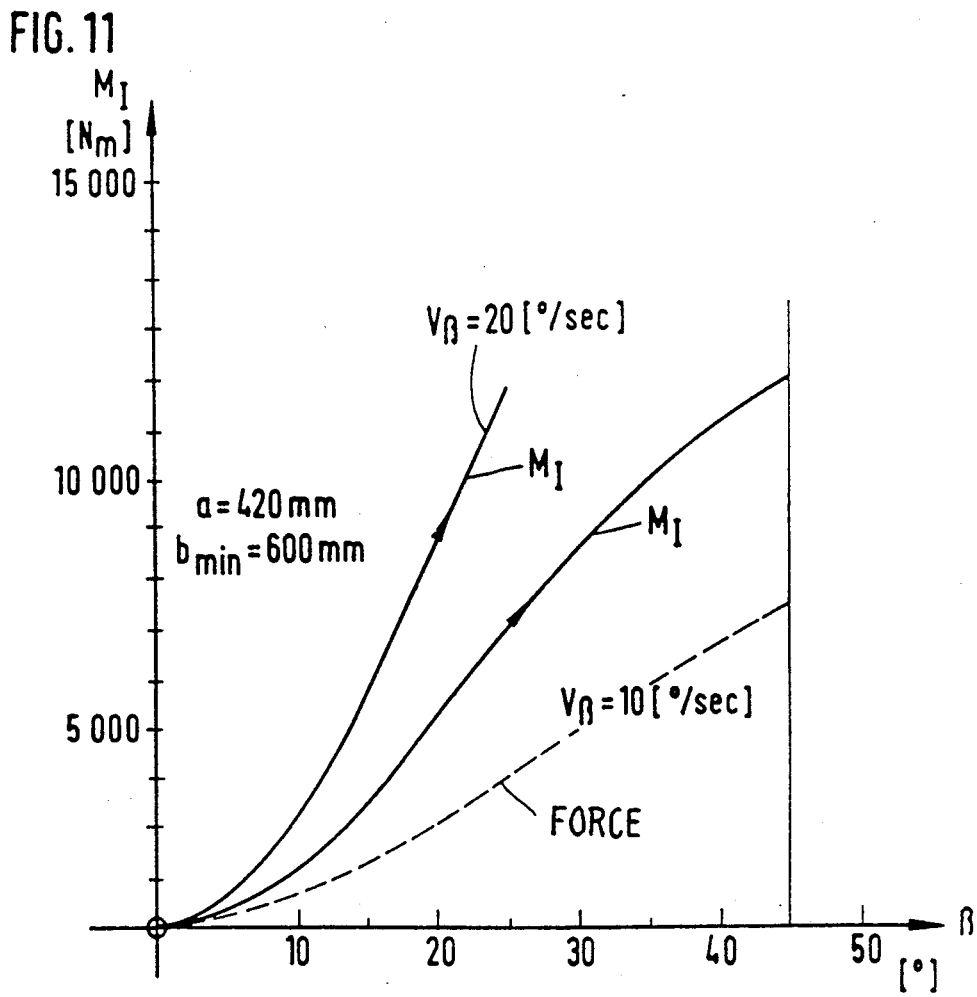
FIG. 11 is a graph of damping moment about the articulated axis of the pivot joint as a function of articulation angle (related to FIGS. 1 and 2).

FIG. 11 shows the damping moment M of the hydraulic cylinder or shock absorber around the articulation axis for the two aforesaid different constant articulation velocities with a force $F_A$ equal to 30,000N.

$$M = \frac{F \cdot a \cdot \sin\beta(a + b_{min})f}{\sqrt{[(a + b_{min}) - (\cos\beta) \cdot a]^2 + (a \cdot \sin\beta)^2}}$$

wherein $f = \frac{V_x}{V_{max}}$

Figure 2:
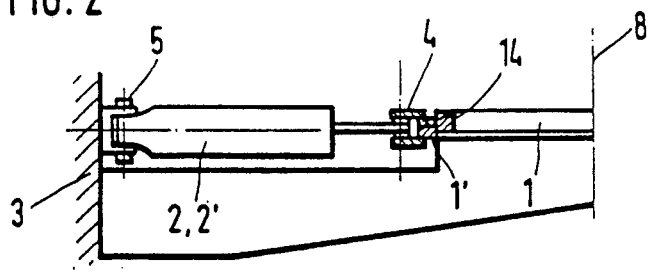
FIG. 2 is a side elevation and a partial section of the joint damping device.
Figure 4:
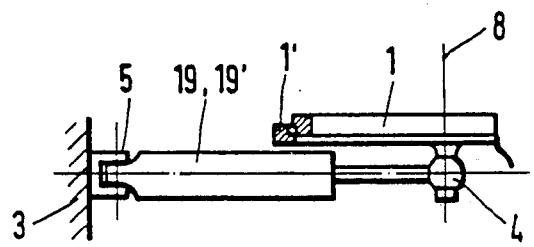
FIG. 4 is a side elevation an partial section of the joint damping device FIG. 3.
Figure 3:
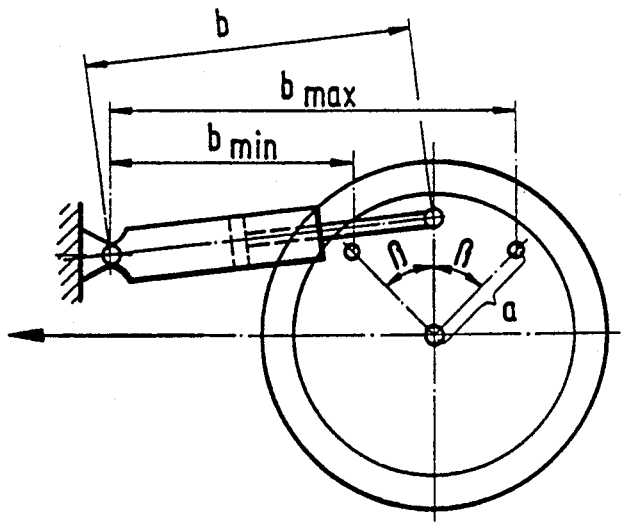
FIG. 3 shows an alternative design of a joint damping device as seen in plan.

FIGS. 3 and 4 show another joint damping device as part of an articulated omnibus, in which the front vehicle 3 is connected with the rear vehicle 6 via the live ring 1. Between the front vehicle 3 and the outer race ring 1' of the live ring, (connected via the pivot joints 7 and linkage means with the rear vehicle 6 as in FIGS. 1 and 2) there is a hydraulic cylinder or shock absorber 19 and, respectively, 19' which is so arranged that one of its ends is connected via a pivot or ball joint 5 in a pivoting manner with the front vehicle 3 while the other end thereof it is connected via a pivot or ball joint 4 with the outer race ring 1' of the live ring 1, the ball joint 4 being arranged under the live ring in the transverse median plane, the hydraulic cylinder or shock absorber 19 or, respectively, 19' being arranged at a distance, and preferably with a slightly oblique setting, from the longitudinal median plane of the vehicle and the hydraulic cylinder or shock absorber 19 or, respectively, 19' is at the center of its stroke in the extended position of the vehicle.

Figure 12:
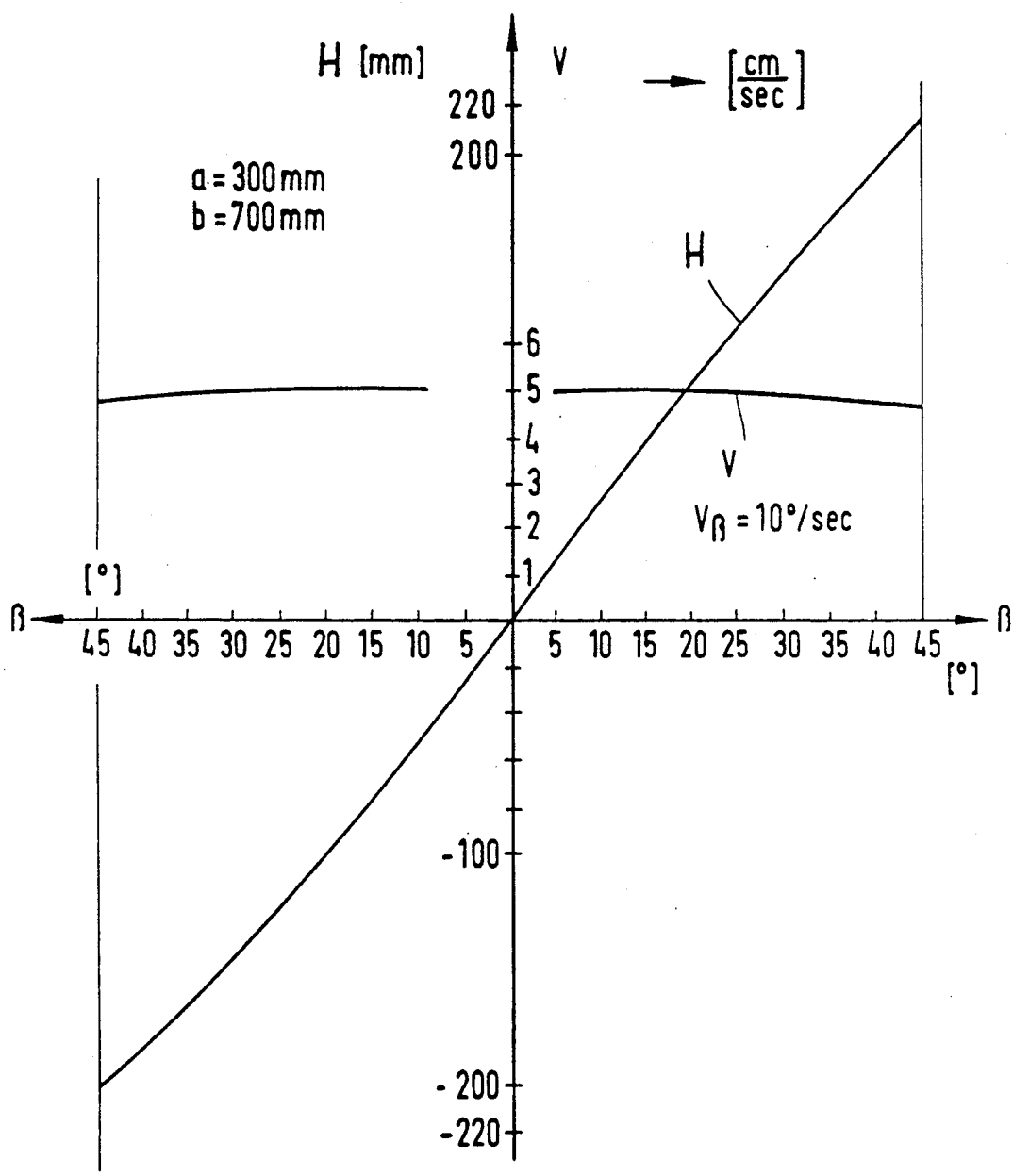
FIG. 12 is a graph of cylinder stroke and piston velocity as a function of articulation angle (related to FIGS. 3 and 4).

In FIG. 12 the piston stroke H and the piston velocity $V_b$ are plotted against the articulation angle $\beta$, the cylinder or shock absorber piston being at the middle of its stroke in the extended setting of the articulated vehicle. The piston velocity curve does not in this case pass through zero and is generally straight.

$$H = b_x - b_{mean} =$$

-continued
$$\sqrt{(b_{mean} + a \cdot \sin\beta)^2 + (a - a \cdot \cos\beta)^2} - b_{mean}$$

$$V_b = \frac{\Delta stroke}{\Delta \beta} \cdot V_\beta$$

Figure 13:
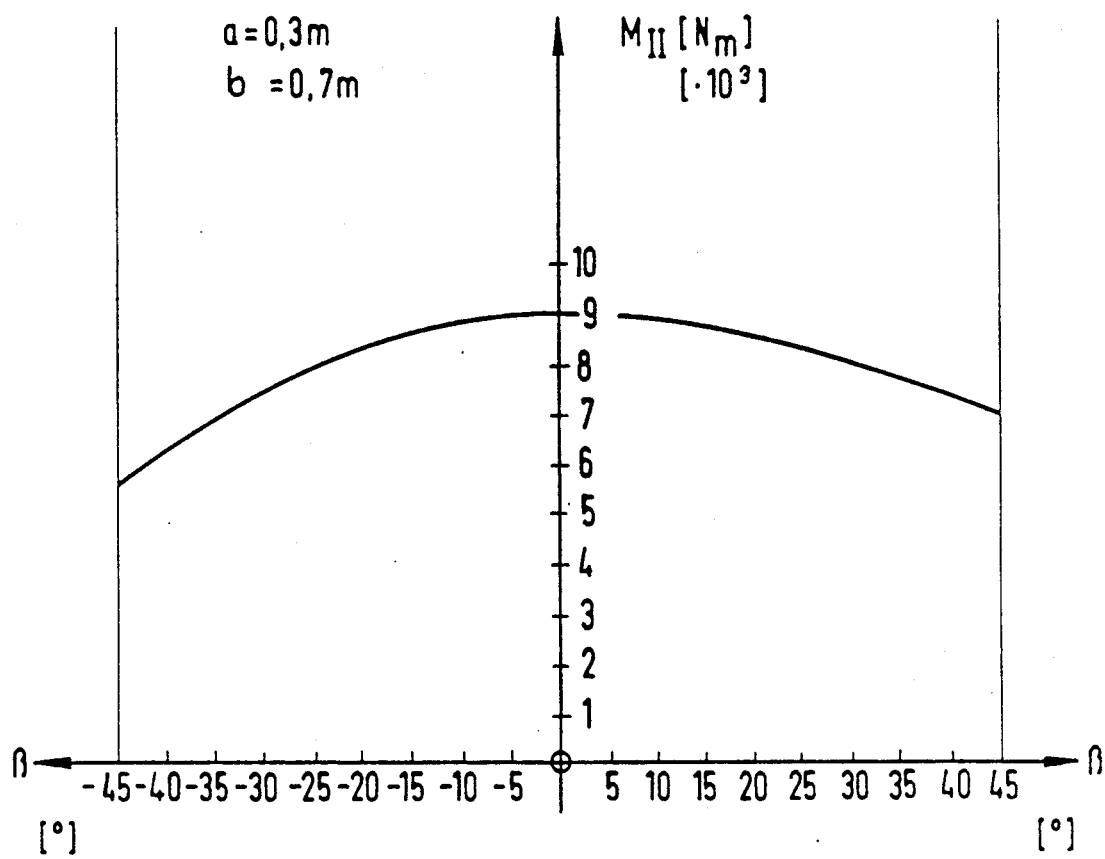
FIG. 13 is a graph of damping moment about the articulation axis as a function of the articulation angle (related to FIGS. 3 and 4).

The corresponding damping moment may be seen from FIG. 13.

$$M = F \cdot \sqrt{a^2 + b_{mean}^2} \cdot$$

$$\sin \left[ \arctan \left( \frac{a}{b_{mean}} - \frac{a - a \cdot \cos\beta}{b_{mean} + a \cdot \sin\beta} \right) \right]$$

FIGS. 5 and 6 show the joint damping device in accordance with the invention as fitted to an articulated omnibus, to represent a combination of the systems of FIGS. 1, 2 and 3, 4. In this case a hydraulic cylinder or shock absorber 2 or, respectively, 2' is to be seen in a customized arrangement with a hydraulic cylinder or shock absorber 19 or, respectively, 19' in a parallel circuit so that the damping forces developed by the pistons in the cylinders of the piston-cylinder units of the hydraulic cylinders or shock absorbers produce a damping moment characteristic as in FIG. 14, the damping moment having a certain value even in the extended in-line position of the vehicle and merging with a curve for opposite directions of articulation angle, which meets the demand for a greater damping effect progressively increasing the articulation angle increases.

Figure 14:
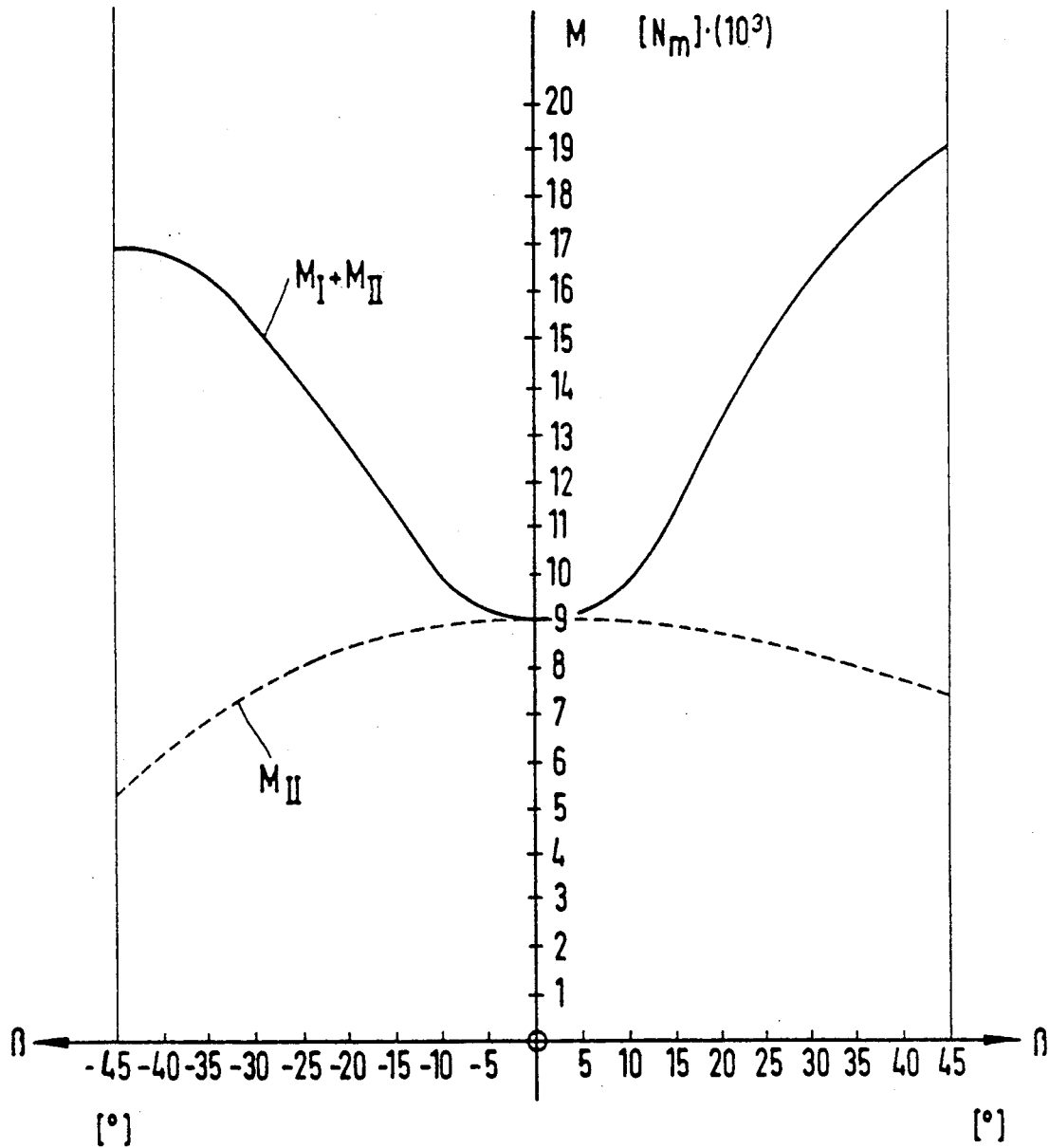
FIG. 14 is a graph of the damping moment about the articulated axis as a function of articulation angle (related to FIGS. 5 and 6).

The curve in FIG. 14 results from a combination of the curves of FIGS. 11 and 13.

It is obviously possible for the stabilizing moment function or curve to be modified by changing the choke cross section or adjusting the pivot points of the hydraulic cylinder or shock absorber 19 or respectively, 19' in such a manner that the curve extends symmetrically on the two sides of the vertical graph axis.

In the arrangement of the stabilizing joint as in FIGS. 5 and 6 with the corresponding function of the damping moment as in FIG. 14 it is possible to obtain the system in accordance with the invention which has been optimized for use in practical conditions, that is to say for use in a system in which even in the extended setting of the articulated vehicle a certain damping moment is established, which opposes weaving of the vehicle and in the case of a larger articulation angle the damping moment progressively increases in order to adequately deal with the risk of jackknifing.

Figure 15:
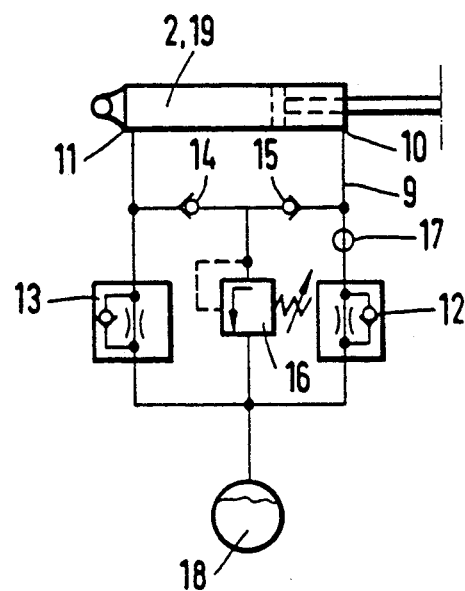
FIG. 15 is a schematic hydraulic circuit.

FIG. 15 shows a schematic hydraulic circuit with a cylinder 2 or 19 which has ports 10 and 11 at its ends which are connected by a line 9 forming a loop. Adjustable choke valves 12 and 13 are arranged in parallel connection branches of the branch 9. One respective line is arranged to be put under pressure at a time, since there are oppositely directed shut off valves 14 and 15 between the two branches and there is a line between such valves, in which an excess pressure valve 16 is placed. In order to minimize leakage losses and provide different stroke displacements there is a pressure accumulator 18 in the system. If a choke valve, as for instance 12, is present it may be used for modifying the damping moment, whereas in the arrangement having two choke valves 12 and 13 they may be used both for modifying the damping moment and for adjustment in the case of a design of the joint stabilizing system as in FIG. 5 to achieve a balance between the different piston areas. With the aid of a shut off valve 17 it is possible to achieve constant damping, which may be desirable in various situations. The operation of the shut off valve 17 may be by hand by the driver in a hazard situation using a suitable push button or such operation may be automatic as a function of an anti-wheel lock or anti-wheel spin system.

The above different forms of the invention are described in the form of a single system, but they may be designed in the form of a redundant system as claimed, there then being either the advantage of slim cylinders or of just such a redundant system, which is failure-proof in operation.

Figure 16:
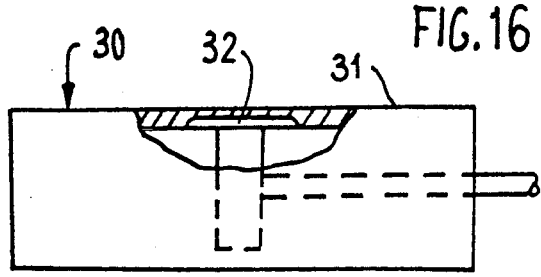
FIG. 16 diagrammatically illustrates a s hock absorber with variable damping characteristics.

FIG. 16 illustrates a portion of a shock absorber 30 which can be used as a hydraulic piston-cylinder unit in the arrangement of the invention. The shock absorber 30 has a damping characteristic which varies as a function of the stroke. For this purpose, the shock absorber 30 comprises a cylinder 31 having a by-pass groove 32 in the inner wall surface thereof located in the central part of the piston stroke to provide smaller damping effect thereat.

What is claimed is:

1. A damping device for an articulated omnibus having front and rear vehicles connected together by a rotatable joint providing relative rotation about an articulation axis between an in-line position in which the vehicles are longitudinally aligned and angulated positions of the vehicles, said damping device comprising
   first hydraulic piston-cylinder means pivotably connected to one of said vehicles and to said rotatable joint for resisting rotation of the joint, said first hydraulic piston-cylinder means being located in a longitudinal median plane of the omnibus when the vehicles are in longitudinally aligned position, and having an inner dead center position in said longitudinally aligned position of the vehicles,
   a second hydraulic piston-cylinder means pivotably connected to a first of said vehicles and to said rotatable joint for resisting rotation of the joint, said second hydraulic piston-cylinder means being disposed in laterally offset relation from said longitudinal median plane when the vehicles are in said longitudinally aligned position, each of said hydraulic piston-cylinder means comprising a cylinder, a piston slidable in said cylinder and hydraulic fluid in said cylinder to resist displacement of the piston in said cylinder, said piston of said second hydraulic piston-cylinder means being in an intermediate stroke position when the vehicles are in said longitudinally aligned position, said second hydraulic piston-cylinder means having a pivotable connection with the rotatable joint which, when the vehicles are in said aligned position, is located on a transverse median plane of the rotatable joint, said first hydraulic piston-cylinder means undergoing expansion from said inner dead center position upon relative rotation of said joint from said longitudinally aligned position of the vehicles to produce increasing force and increasing damping moment around the articulation axis, said second hydraulic piston-cylinder means undergoing displacement, upon relative rotation of said joint from the aligned position of the vehicles, which produces decreasing damping moment around the articulation axis, said first and second hydraulic piston-cylinder means acting in combination to produce a net damping moment around the articulation axis, when the vehicles are relatively angularly displaced from said longitudinally aligned positions which progressively increases in both directions of relative rotation of the joint around said articulation axis.

2. A damping device as claimed in claim 1 wherein said piston and cylinder of said second hydraulic piston-cylinder means are disposed along an axis which is slightly oblique relative to said longitudinal median plane in said longitudinally aligned position of the vehicles.

3. A damping device as claimed in claim 1 wherein said first and second hydraulic piston-cylinder means are both pivotably connected to the same vehicle.

4. A damping device as claimed in claim 1 wherein said rotatable joint comprises a ring member and a rotatable race ring, said first and second hydraulic piston-cylinder means both being pivotably connected to said race ring and to one of said vehicles, the other vehicle being connected to said race ring to produce relative rotation of said ring member and said race ring as the vehicles undergo change in angulation.

5. A damping device as claimed in claim 4 comprising pivot joints connected to said race ring and linkage means connected to said pivot joints and fixed to said other vehicle.

6. A damping device s claimed in claim 4 wherein said race ring surrounds said ring member, said other vehicle being said rear vehicle to which said race ring is connected, said one vehicle being said front vehicle to which said first and second hydraulic piston-cylinder means are pivotably connected.

7. A damping device as claimed in claim 4 comprising a hydraulic circuit for at least one of said hydraulic piston-cylinder means including means for controlling damping action of said at least one hydraulic piston-cylinder means.

8. A damping device as claimed in claim 7 wherein said at least one hydraulic piston-cylinder means comprises a cylinder, a piston in said cylinder defining working chambers in said cylinder on opposite sides of the piston, ports connected to respective chambers, a connection line in the form of a loop connected to said ports, said means for controlling damping action comprising a choke valve in said connection line.

9. A damping device as claimed in claim 8 comprising pivot joints connected to said race ring and linkage means connected to said pivot joints and fixed to said other vehicle, first and second choke valves in said connection line, each choke valve being associated with a respective port.

10. A damping device as claimed in claim 9 further comprising check valves connected across said loop between respective ports and their associated choke valves.

11. A damping device as claimed in claim 10 further comprising an excess pressure valve in said loop connected to said check valves.

12. A damping device as claimed in claim 9 further comprising a shut off valve in said loop to prevent flow of hydraulic fluid in said loop from one chamber of the cylinder to the other chamber via the choke valves in a shut position of said shut off valve so that a constant damping effect is produced over the entire angle of articulation of the vehicles of the omnibus.

13. A damping device as claimed in claim 1 wherein said intermediate stroke position of the piston in the second hydraulic piston-cylinder means is a midstroke position of said piston.

14. A damping device as claimed in claim 1 wherein at least one of said hydraulic cylinder means comprises a shock absorber.

15. A damping device as claimed in claim 14 wherein said shock absorber includes a piston and is constructed to provide shock absorbing action as a function of displacement of said piston.

16. A damping device as claimed in claim 15 wherein said shock absorber has at least one bypass groove in order to provide a reduced shock absorbing effect in at least one part of the stroke of the piston thereof.

* * * * *